United States Patent
Lin et al.

(10) Patent No.: US 6,883,075 B2
(45) Date of Patent: Apr. 19, 2005

(54) MICROCONTROLLER HAVING EMBEDDED NON-VOLATILE MEMORY WITH READ PROTECTION

(75) Inventors: Fong-Long Lin, Fremont, CA (US); Wei Xu, Shaanxi (CH)

(73) Assignee: Silicon Storage Technology, Inc., Sunnyvale, CA (US)

( * ) Notice: Subject to any disclaimer, the term of this patent is extended or adjusted under 35 U.S.C. 154(b) by 482 days.

(21) Appl. No.: 10/052,327

(22) Filed: Jan. 17, 2002

(65) Prior Publication Data

US 2003/0135706 A1 Jul. 17, 2003

(51) Int. Cl.[7] .............................................. G06F 12/00
(52) U.S. Cl. ...................................... 711/163; 711/200
(58) Field of Search ........................... 711/163; 710/200

(56) References Cited

U.S. PATENT DOCUMENTS

| | | | | |
|---|---|---|---|---|
| 5,014,191 A | * | 5/1991 | Padgaonkar et al. | 711/163 |
| 5,251,304 A | * | 10/1993 | Sibigtroth et al. | 713/200 |
| 5,758,121 A | * | 5/1998 | Fukuzumi | 711/164 |
| 5,930,826 A | * | 7/1999 | Lee et al. | 711/163 |

OTHER PUBLICATIONS

U.S. Appl. No. 10/206,635, filed Jul. 26, 2003, Fong Long Lin, et al.

* cited by examiner

Primary Examiner—Mano Padmanabhan
Assistant Examiner—Paul Baker
(74) Attorney, Agent, or Firm—DLA Piper Rudnick Gray Cary US LLP

(57) ABSTRACT

A single integrated circuit microcontroller 10 including embedded erasable/programmable non-volatile memory 12 having a read protection. Microcontroller 10 can operate within a special mode in which external circuits may access memory 12 by use of input/output pins 18. When microcontroller 10 activates this special mode, a read protection flag 13 within memory 12 is checked. The read protection flag 13 may be set during production of the microcontroller 10 after instructional data or firmware has been installed onto memory 12. If the read protection flag 13 has been set, the contents of memory 12 are erased or reprogrammed prior to allowing access to memory 12. In this manner, external circuits cannot access instructional data or firmware that is stored in memory 12.

5 Claims, 1 Drawing Sheet

MICROCONTROLLER HAVING EMBEDDED NON-VOLATILE MEMORY WITH READ PROTECTION

FIELD OF THE INVENTION

The present invention generally relates to a microcontroller, and more particularly to a microcontroller having embedded non-volatile memory with read protection, which prevents unauthorized access to the embedded non-volatile memory by selectively erasing or reprogramming the memory content when the microcontroller is operating in a special mode.

BACKGROUND OF THE INVENTION

A microcontroller is an integrated circuit that may be used in a wide variety of applications, and typically includes a processor or control unit, input/output units, and embedded memory, such as random access memory ("RAM") and read only memory ("ROM").

One type of microcontroller further includes embedded erasable/programmable non-volatile memory, such as flash memory. This type of microcontroller is typically designed to execute only internal memory instructions (i.e., instructions originating from inside the microcontroller) on the embedded non-volatile memory. In this type of microcontroller, no address or data signals, or only partial address/data signals, can be monitored from outside the device. Therefore, internal memory operations cannot be monitored from outside the microcontroller.

In order to program instructional data or firmware onto the embedded non-volatile memory of this type of microcontroller during production, a special mode is created that allows data to be multiplexed onto the embedded non-volatile memory from one or more input/output pins. The special mode is typically activated by communicating a predetermined sequence of signals to the input/output pins.

While this special mode allows firmware to be efficiently installed within the microcontroller, it also will allow external circuits to access the non-volatile memory by activating the special mode (i.e., by communicating the predetermined sequence of signals to the microcontroller's input/output pins). Hence, the firmware stored within the non-volatile memory could potentially be read out and duplicated by an unauthorized party accessing the special mode.

It is therefore desirable to provide a microcontroller having embedded erasable/programmable non-volatile memory which overcomes the foregoing drawbacks of prior microcontrollers and which has the ability to prevent access to data stored within the embedded non-volatile memory while the microcontroller is operating in a special mode.

SUMMARY OF THE INVENTION

A first non-limiting advantage of the invention is that it provides a microcontroller having embedded non-volatile memory which overcomes at least some of the drawbacks of prior microcontrollers.

A second non-limiting advantage of the invention is that it provides a microcontroller having embedded non-volatile memory with read protection, which prevents unauthorized access to the embedded non-volatile memory by erasing or reprogramming the memory content when external circuits attempt to enter the memory through a special mode.

A third non-limiting advantage of the invention is that it provides a microcontroller having an embedded flash memory unit which includes a read protection flag or byte that is checked before the content of the memory unit can be accessed (e.g., before memory unit is electrically connected to the microcontroller's external pins). If the read protection flag is set, an internal circuit will commence a chip erase or program operation on the embedded flash memory before the memory unit is communicatively connected to the external pins.

A fourth non-limiting advantage of the invention is that it provides a method of preventing external circuits from accessing or duplicating a microcontroller's firmware that is stored within its embedded non-volatile memory by selectively altering (e.g., erasing or reprogramming) the firmware based upon the value of a read protection byte or flag that is checked when a special mode is activated.

According to a first aspect of the present invention, a single integrated circuit microcontroller having embedded non-volatile memory with read protection is provided. The microcontroller includes an erasable/programmable non-volatile memory unit; a read protection flag stored within the microcontroller; and a logic portion which is adapted to detect when a special mode is activated, to check the read protection flag upon detecting a special mode, and to allow external access to the non-volatile memory unit only if the special mode is activated and the read protection flag is cleared.

According to a second aspect of the present invention, a single integrated circuit microcontroller having self-erase read protection is provided. The microcontroller includes: a flash memory unit containing a read protection flag; a processing unit; a plurality of input/output pins; at least one switching circuit which is adapted to selectively connect and disconnect the plurality of input/output pins to and from the flash memory unit and the processing unit; a special mode detection circuit which is communicatively coupled to the at least one switching circuit and the plurality of input/output pins, the special mode detection circuit being adapted to detect when a special mode is activated, and to selectively generate a first signal and a second signal when the special mode is activated, wherein the second signal is communicated to the at least one switching circuit, effective to connect the plurality of input/output pins to the flash memory unit only when the special mode is activated; and a flash memory control circuit which is communicatively coupled to the special mode detection circuit, and which is adapted to receive the first signal, to check the read protection flag upon receipt of the first signal, to erase the flash memory unit and clear the read protection flag if the read protection flag is set and the special mode is activated, and to communicate a third signal to the special mode detection circuit when the read protection flag is cleared and the special mode is activated; wherein the third signal is effective to cause the special mode detection circuit to generate the second signal only after receipt of the third signal, thereby preventing the plurality of input/output pins from being connected to the flash memory unit unless the special mode is activated and the read protection flag is cleared.

According to a third aspect of the present invention, a method is disclosed for providing read protection for a microcontroller including an embedded programmable non-volatile memory unit having a first portion that stores certain firmware, and a special mode in which the programmable non-volatile memory unit is externally accessible. The method includes the steps of: storing a read protection flag in the microcontroller; detecting when the special mode is activated; checking the read protection flag when the special mode is activated; and allowing external access to the first portion of the memory unit only if the read protection flag is cleared.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
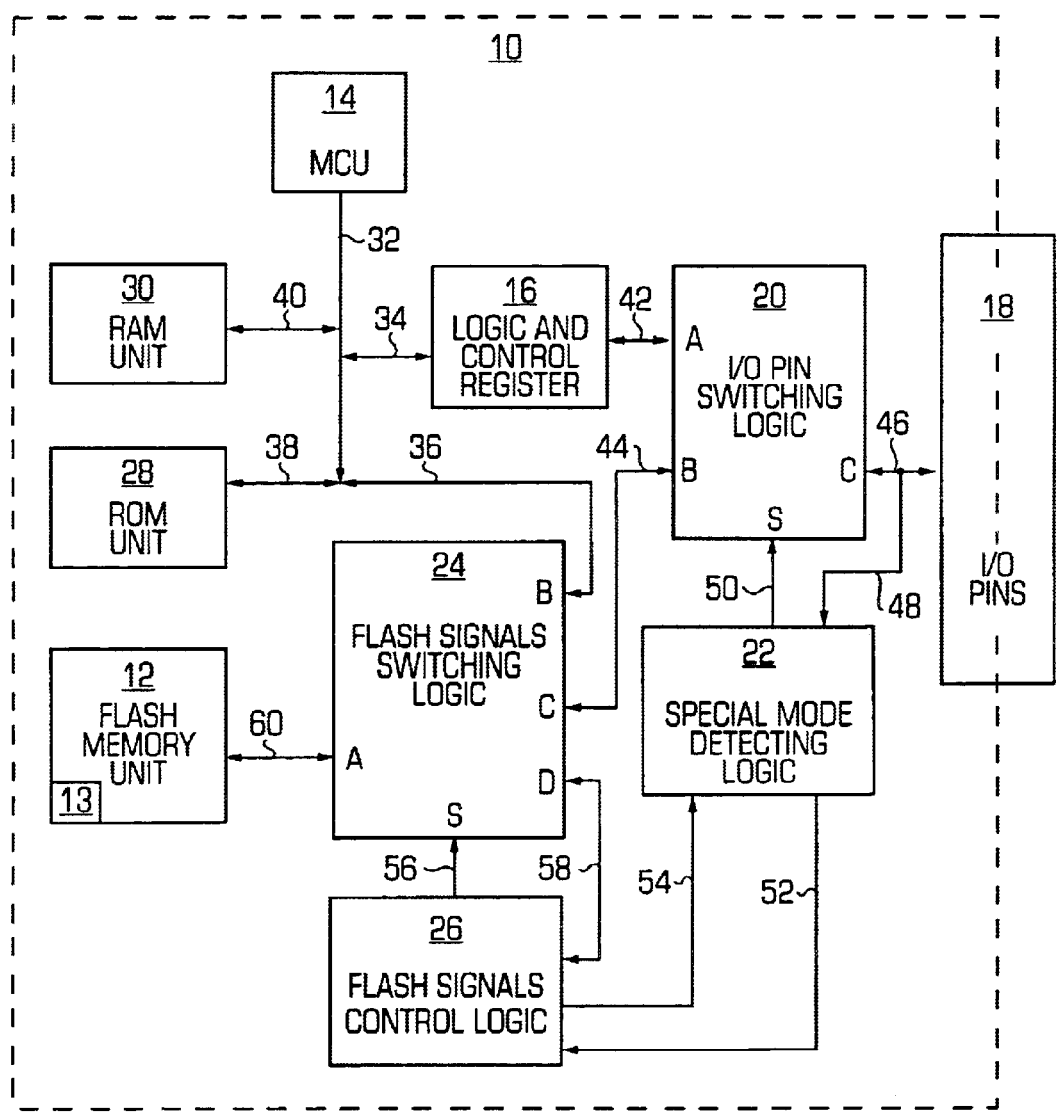
FIG. 1 is a block diagram of a microcontroller having embedded programmable non-volatile memory with read protection in accordance with a preferred embodiment of the present invention.

FIG. 1 illustrates a single integrated circuit microcontroller 10 having an embedded erasable/programmable non-volatile memory unit 12 with read protection in accordance with a preferred embodiment of the present invention. In the preferred embodiment, memory unit 12 may be a conventional flash memory array, and in alternate embodiments, unit 12 may be any other suitable type of erasable/programmable memory. Microcontroller 10 is adapted to selectively operate in a special mode in which an external circuit can gain control of flash memory unit 12 by use of input/output pins 18 (e.g., in which pins 18 are communicatively coupled to memory unit 12). This special mode may be activated by communicating a predetermined sequence of signals to the input/output pins 18, and allows a manufacturer to program instructional data, microcode or firmware into flash memory unit 12 (e.g., during production or in a laboratory for debugging operations). Memory unit 12 includes a read protection flag or byte 13, which may be set during the production of the microcontroller 10 after instructional data or firmware has been installed onto memory 12.

In the preferred embodiment, microcontroller 10 includes erasable/programmable non-volatile memory unit 12, a processing unit or micro-control unit ("MCU") 14, a logic and control register circuit 16, input/output pins 18, input/output pin switching logic 20, special mode detecting logic 22, flash signals switching logic 24, and flash signals control logic 26. Microcontroller 10 may also include a conventional read-only memory ("ROM") unit 28 and a random access memory ("RAM") unit 30.

In the preferred embodiment of the invention, micro-control unit 14 includes a conventional and commercially available semiconductor processing device (e.g., a microprocessor). Micro-control unit 14 is communicatively coupled to logic and control register circuit 16 by use of data buses 32, 34, to flash signals switching logic 24 (e.g., to terminal B of circuit 24) by use of buses 32, 36, to ROM unit 28 by use of buses 32, 38, and to RAM unit 30 by use of buses 32, 40. As is well known to those of ordinary skill in the art, other buses, such as address and control buses (not shown) are also provided between the MCU 14 and the aforementioned elements. Logic and control register circuit 16 includes conventional microcontroller logic and control register circuitry which operates with micro-control unit 14 to communicate control signals to and from input/output pins 18.

Input/output pin switching logic 20 includes one or more conventional switching circuits having one or more electrical switches (e.g., transistors) that may be selectively activated in response to control signals received at a select terminal (e.g., terminal S), effective to electrically connect any connection terminal of the circuit 20 (e.g., terminal A, B or C) to a different connection terminal. In the preferred embodiment, logic 20 includes first, second and third connection terminals (i.e., terminals A, B, and C, respectively) and a select terminal (i.e., terminal S). The first terminal A is communicatively coupled to logic and control register 16 by use of bus 42, the second terminal B is communicatively coupled to flash signals switching logic 24 (i.e., to terminal C of logic 24) by use of bus 44, the third terminal C is communicatively coupled to input/output pins 18 by use of bus 46, and the select terminal S is communicatively coupled to the special mode detecting logic 22 by use of bus 50.

Special mode detecting logic 22 includes a conventional control circuit that is adapted to detect when the special mode has been activated and to provide control signals to input/output pin switching logic 20 and flash signals control logic 26 in response to such a detection. Logic 22 is communicatively coupled to input/output pins 18 by use of buses 48, 46, and to flash signals control logic 26 by use of buses 52, 54. In the preferred embodiment, logic 22 comprises one or more conventional sequencing circuits, which are adapted to detect a special mode by sensing a certain predetermined sequence of signals communicated to pins 18. In other alternate embodiments, a special mode may be detected in any other suitable manner. In one non-limiting embodiment, logic 22 comprises one or more high voltage detectors, which are adapted to detect a special mode by detecting a relatively high voltage signal communicated to pins 18.

Flash signals control logic 26 is a conventional control circuit that is adapted to perform conventional memory operations on flash memory unit 12, such as read, program and erase operations. Logic 26 is further adapted to provide control signals to flash signals switching logic 24 and to special mode detecting logic 22. Flash signals control logic 26 is communicatively coupled to the select terminal S of flash signals switching logic 24 by use of bus 56, and to terminal D of logic 24 by use of bus 58.

Flash signals switching logic 24 includes one or more conventional switching circuits having one or more electrical switches (e.g., transistors) that may be selectively activated in response to control signals received at a select terminal (e.g., terminal S), effective to electrically connect any of connection terminals of the circuit 20 (e.g., terminal A, B, C or D) to a different connection terminal. In the preferred embodiment, logic 24 includes first, second, third and fourth connection terminals (i.e., terminals A, B, C, and D, respectively) and a select terminal (i.e., terminal S). The first terminal A is communicatively coupled to flash memory unit 12 by use of bus 60, the second terminal B is communicatively coupled to micro-control unit 14 by use of buses 36, 32, the third terminal C is communicatively coupled to the second terminal B of input/output switching logic 20 by use of bus 44, and the fourth terminal D is communicatively coupled to flash control logic 26 by use of bus 58.

It should be appreciated that the microcontroller 10 illustrated in FIG. 1 may further include additional and/or different circuit elements or portions which assist in the reading, programming and erasing of data from flash memory unit 12 and in the general operation of microcontroller 10, such as additional buses, memory units, pins, multiplexers, buffers, counters, shift registers, circuits and other elements necessary and/or desirable to perform memory and control operations.

In operation, external sources cannot access flash memory unit 12 of microcontroller 10 unless the special mode is activated. When the microcontroller 10 is not operating in the special mode, special mode detecting logic 22 communicates a signal to the select terminal S of input/output pin switching logic 20, effective to cause logic 20 to electrically connect terminal A to terminal C, and to disconnect terminals B and C. In this state, the micro-control unit 14 has access to the input/output pins 18, thereby allowing the micro-control unit 14 to transmit and receive electrical signals and data. Particularly, micro-control unit 14 has access to input/output pins 18 through the path created by buses 32, 34, 42, 46 and logic 20. Additionally, no electrical connection or path exists between pins 18 and memory unit 12, thereby preventing external sources from accessing memory unit 12 through pins 18.

Additionally, when logic 22 determines that microcontroller 10 is not operating in the special mode, it communicates a corresponding signal to flash signals control logic 26. In response to receiving a signal from logic 22 indicating that the special mode is not active, flash signals control logic 26 communicates a signal to the select terminal S of flash signals switching logic 24, effective to cause logic 24 to electrically connect terminal A to terminal B. In this manner, the micro-control unit 14 has access to the flash memory unit 12, thereby allowing the micro-control unit 14 to transmit and receive data to and from unit 12. Particularly, micro-control unit 14 has access to unit 12 through the path created by buses 32, 36, 60 and logic 24.

When logic 22 detects a special mode, it instructs logic 24 to check the read protection flag or byte 13 in flash memory unit 12. Logic 22 maintains the connection between terminal A and terminal C (and disconnection of terminals B and C) of input/output pin switching logic 20 until the read protection byte 13 is checked. During this time, external circuits cannot gain access to unit 12 through pins 18.

In order to check the read protection byte in flash memory unit 12, control logic 26 communicates a signal to select terminal S of switching logic 24, effective to electrically connect terminal A to terminal D. In this state, control logic 26 has access to flash memory unit 12 through the path created by buses 58, 60 and logic 24. Control logic 26 then performs a read operation on the read protection flag or byte 13 in flash memory unit 12 to determine whether it is set or cleared.

If the read protection flag 13 is cleared, the flash signals control logic 26 communicates a signal to terminal S of logic 24, effective to electrically connect terminal A to terminal C. The flash signals control logic 26 also informs special mode detecting logic 22 that the read protection flag or byte 13 is cleared. In response, logic 22 communicates a signal to select terminal S of input/output pin switching logic 20, effective to cause logic 20 to electrically connect terminal B to terminal C. This will electrically connect input/output pins 18 to flash memory unit 12, thereby allowing external circuits to access flash memory unit 12 to perform read, program and erase operations on unit 12. Particularly, external circuits may access flash memory unit 12 through pins 18 by the path created by buses 46, 44, 60 and logic 20, 24. In this manner, the flash memory unit 12 may be programmed at any time during or after the manufacturing process (e.g., firmware may be installed onto flash memory unit 12). When the firmware of the unit 12 is programmed, the read protection flag 13 may be set, in order to prevent external access to the embedded firmware. Alternatively, the firmware stored on unit 12 may include instructions to set the read protection flag 13 upon the occurrence of a predetermined post-processing condition.

When flash signals control logic 26 determines that the read protection byte is set during a special mode, logic 26 causes flash signals switching logic 24 to maintain the terminal A to terminal D connection. In the preferred embodiment, the flash signals control logic 26 then initiates a chip erase operation on flash memory unit 12. The chip erase operation erases the firmware and causes the read protection flag 13 to be cleared (i.e., reset to indicate no read protection). It should be appreciated that the chip erase operation performed by control logic 26 may be adapted to erase all of the content of memory unit 12 or to erase only protected or "confidential" portions of memory unit that store certain firmware or microcode. In alternate embodiments, control logic 26 may protect firmware stored in memory unit 12 by selectively altering it in any other suitable manner. For example, in one non-limiting embodiment, control logic 26 is adapted program over or "reprogram" the firmware stored in memory unit 12 (e.g., with predetermined or random data) when the read protection byte is set during a special mode, and to subsequently clear the read protection flag.

Upon completion of the chip erase (or reprogramming) operation, flash signals control logic 26 communicates a signal to terminal S of the flash signals switching logic 24, effective to cause logic 24 to electrically connect terminal A to terminal C. Flash signals control logic 26 further communicates a signal to special mode detecting logic 22 that informs logic 22 that the chip erase (or reprogramming) operation has been completed and/or that the read protection flag 13 is cleared. In response, the special mode detecting logic 22 communicates a signal to terminal S of the input/output pin switching logic 20, effective to cause logic 20 to electrically connect terminal B to terminal C, thereby electrically connecting the flash memory unit 12 to input/output pins 18. Particularly, pins 18 will be electrically connected to flash memory unit 12 through the path created by buses 46, 44, 60 and logic 20, 24. In this state, microcontroller 10 will allow external circuits to access flash memory unit 12 to perform read, program and erase operations, while ensuring that any instructional data or firmware on unit 12 has been altered (e.g., erased or reprogrammed) prior to such access.

In alternate embodiments, the read protection flag 13 may be stored and checked in other locations or components of microcontroller 10 (e.g., within RAM unit 30, logic and control register 16 and/or different or additional components that may comprise a portion of the microcontroller 10). Additionally, in another non-limiting embodiment, microcontroller 10 may be manufactured or programmed in a "read-only" mode. In this embodiment, flash signals control logic 26 will not erase flash memory unit 12 or allow access to flash memory unit 12 once the read protection flag 13 has been set. In other alternate embodiments, microcontroller 10 may use a different predetermined condition in place of a read protection flag 13 in order to determine whether to allow external access to memory unit 12 and/or to erase memory unit 12 prior to allowing external access. For example, microcontroller 10 may allow access to memory unit 12 only when the special mode is activated and after a predetermined condition is detected (e.g., memory unit 12 is erased).

In yet another embodiment, microcontroller 10 provides read protection to only a portion of memory unit 12, containing confidential firmware or instructional data. In this embodiment, special mode detecting logic 22 is further adapted to receive the addresses associated with requests to access unit 12 from external circuits through input/output pins 18, and to restrict access to memory unit 12 based on the locations of those addresses. When a special mode is detected, logic 22 will permit external circuits to access certain "unprotected" portions or addresses of unit 12 (e.g., portions that do not contain any firmware or instructional data), regardless of whether the read protection flag 13 is set or cleared. Logic 22 receives memory access requests including the corresponding address signals from external circuits through input/output pins 18. When logic 22 receives external requests to access addresses within flash memory unit 12 during a special mode, it compares the requested addresses to predetermined stored values in order to determine whether the requests are for "confidential" or protected portions of memory unit 12 that store firmware or instructional data. If the address requests correspond to only unprotected locations, microcontroller 10 (e.g., logic 20–26) will electrically connect pins 18 to memory unit 12, thereby allowing external circuits to access the unprotected locations. However, if the address requests correspond to any confidential or protected portions of memory unit 12, logic 26 will check the read protection flag. If the read protection flag 13 is set, microcontroller 10 will alter (e.g., erase or reprogram) the content of the protected portions prior to allowing access to those portions (e.g., prior to clearing the read protection flag 13 and electrically connecting pins 18 to memory unit 12). In such an event, microcontroller 10 will reprogram or erase the protected portions within memory unit 12 in the previously described manner (i.e., by use of flash signals control logic 26).

The present invention provides a single integrated circuit microcontroller 10 including embedded programmable non-volatile memory 12 having read protection. By use of the read protection flag 13, microcontroller 10 can allow external access to flash memory unit 12 during a special mode, while ensuring that any data or firmware on unit 12 is erased prior to access. In this manner, microcontroller 10 prevents unauthorized access to confidential data and firmware that may be stored within unit 12.

It should be understood that the inventions described herein are provided by way of example only and that numerous changes, alterations, modifications, and substitutions may be made without departing from the spirit and scope of the inventions as delineated within the following claims.

What is claimed is:

1. A single integrated circuit microcontroller having self-erase read protection, comprising:

a flash memory unit containing a read protection flag;

a processing unit;

a plurality of input/output pins;

at least one switching circuit which is adapted to selectively connect and disconnect said plurality of input/output pins to and from said flash memory unit and said processing unit;

a special mode detection circuit which is communicatively coupled to said at least one switching circuit and said plurality of input/output pins, said special mode detection circuit being adapted to detect when a special mode is activated, and to selectively generate a first signal and a second signal when said special mode is activated, wherein said second signal is communicated to said at least one switching circuit, effective to connect said plurality of input/output pins to said flash memory unit only when said special mode is activated; and a flash memory control circuit which is communicatively coupled to said special mode detection circuit, and which is adapted to receive said first signal, to check said read protection flag upon receipt of said first signal, to erase said flash memory unit and clear said read protection flag if said read protection flag is set and said special mode is activated, and to communicate a third signal to said special mode detection circuit when said read protection flag is cleared and said special mode is activated;

wherein said third signal is effective to cause said special mode detection circuit to generate said second signal only after receipt of said third signal, thereby preventing said plurality of input/output pins from being connected to said flash memory unit unless said special mode is activated and said read protection flag is cleared.

2. The microcontroller of claim 1 wherein said special mode detection circuit is adapted to detect a special mode by sensing a predetermined sequence of signals on said plurality of input/output pins.

3. The microcontroller of claim 1 further comprising a random access memory unit which is communicatively coupled to said processing unit.

4. The microcontroller of claim 3 further comprising a read-only memory unit which is communicatively coupled to said processing unit.

5. The microcontroller of claim 4 wherein said processing unit comprises a microprocessor.

* * * * *